United States Patent Office 3,277,061
Patented Oct. 4, 1966

3,277,061
CARBONYLATION OF AMINES AND SUBSTITUTED UREAS DERIVED THEREFROM
Donald M. Fenton, Anaheim, Calif., assignor to Union Oil Company of California, Los Angeles, Calif., a corporation of California
No Drawing. Filed July 1, 1963, Ser. No. 292,067
8 Claims. (Cl. 260—77.5)

This invention relates to the carbonylation of aliphatic and aromatic primary and secondary hydrocarbon amines and diamines and heterocyclic hydrocarbon amines and diamines to prepare substituted ureas which can be used as intermediates in the synthesis of barbituric acids, useful as hypnotics. The ureas can also be used as pre-emergence control herbicides. When diamines are used polymeric ureas are formed which are useful as fibers and plastics.

I have found that substituted ureas can be readily obtained by the reaction of the aforementioned primary and secondary amines with carbon monoxide in the presence of mercuric ions to give substituted ureas as indicated by the following equation:

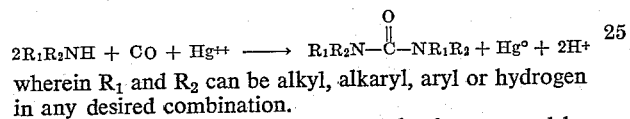

wherein $R_1$ and $R_2$ can be alkyl, alkaryl, aryl or hydrogen in any desired combination.

Polymeric substituted amines can also be prepared by my method by using diamine reactants as indicated by the following equation:

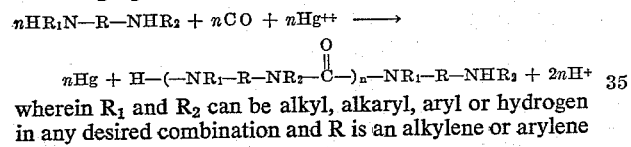

wherein $R_1$ and $R_2$ can be alkyl, alkaryl, aryl or hydrogen in any desired combination and R is an alkylene or arylene radical.

The crude produce is readily obtained free of metallic mercury by decanting the product from the mercury layer and filtering the decanted liquid. When an inert organic reaction medium is employed, the product can be recovered therefrom in conventional techniques, e.g., distillation, crystallization and filtration, extraction, etc.

The reaction is operated at relatively mild conditions, preferably in two stages. The first stage can be operated between about 0° and about 150° C. while the second stage can be operated at between about 100° and about 300° C. The reaction is preferably conducted under anhydrous conditions with or without an added organic reaction medium as a diluent.

The reactant primary or secondary amine is employed with due regard to the desired product. In general, alkyl, alkaryl and aryl primary and secondary hydrocarbon amines and diamines and heterocyclic hydrocarbon amines having from about 1 to about 15 carbon atoms can be employed in the reaction. To illustrate, the following is a listing of various reactants that can be employed and the products obtained therefrom.

When primary amines are employed, e.g., $R_1$ is hydrogen and $R_2$ is an alkyl group, the following are obtained:

| Reactant: | Product |
|---|---|
| Methyl amine | N,N'-dimethyl urea. |
| Ethyl amine | N,N'-diethyl urea. |
| Isopropyl amine | N,N'-diisopropyl urea. |
| Butyl amine | N,N'-dibutyl urea. |
| Isoamyl amine | N,N'-diisoamyl urea. |
| Hexyl amine | N,N'-dihexyl urea. |
| Isoheptyl amine | N,N'-diisoheptyl urea. |
| Octyl amine | N,N'-dioctyl urea. |
| Nonyl amine | N,N'-dinonyl urea. |
| Isodecyl amine | N,N'-diisodecyl urea. |

When the reactant is a primary aryl or alkaryl amine, the following are illustrative:

| Reactant: | Product |
|---|---|
| Aniline | Carbanilide. |
| p-Methyl aniline | 4,4'-dimethylcarbanilide. |
| o-Ethyl aniline | 2,2'-diethylcarbanilide. |
| m-Butyl aniline | 3,3'-dibutylcarbanilide. |
| p-Hexyl aniline | 4,4'-dihexylcarbanilide. |
| 2,5-xylidine | 2,2',5,5'-tetramethylcarbanilide. |

When the reactant is a dialkyl secondary amine, the following products are obtained:

| Reactant: | Product |
|---|---|
| Dimethyl amine | Tetramethyl urea. |
| Dipropyl amine | Tetrapropyl urea. |
| N,N-methylethyl amine | symN,N'-dimethyl diethyl urea. |
| N,N-ethylbutyl amine | symN,N'-diethyl dibutyl urea. |
| Dihexyl amine | Tetrahexyl urea. |

When the reactant is a secondary amine having an aryl and alkyl group, the following are obtained:

| Reactant: | Product |
|---|---|
| N-methyl aniline | N,N'-dimethyl N,N'-diphenyl urea. |
| N-butyl aniline | N,N'-dibutyl N,N'-diphenyl urea. |
| N-hexyl aniline | N,N'-dihexyl N,N'-diphenyl urea. |
| N-ethyl 2,5-xylidine | N,N'-diethyl N,N'-di(2,5 xylidine) urea. |

Wherein the reactant is an aryl secondary amine, the following are obtained:

| Reactant: | Product |
|---|---|
| Diphenyl amine | Tetraphenyl urea. |
| Di-p-tolyl amine | Tetra(p-tolyl) urea. |
| Di-o-tolyl amine | Tetra(o-tolyl) urea. |

Finally, $R_1$ and $R_2$ can be joined together to form a diheterocyclocarbonyl by the use of heterocyclic amines as the reactants to obtain the following carbonyls:

| Reactant: | Product |
|---|---|
| Pyrrole | Dipyrrole carbonyl. |
| Piperidine | Dipiperidine carbonyl. |
| Pyrazole | Dipyrazole carbonyl. |
| Pyrrolidine | Dipyrrolidine carbonyl. |

It is of course apparent that mixtures of the aforementioned reactants can be employed to obtain unsymmetrical ureas, e.g., methylamine and ethylamine can be used to obtain a N,N-methylethyl urea; aniline and xylidine can be used to obtain 2,5-dimethyl carbanilide; dimethylamine and aniline can be employed to obtain a N,N-dimethyl N'-phenyl urea; etc.

In the preparation of polymeric amines, generally diamines having from 1 to about 15 carbon atoms can be employed. To illustrate, the following is a listing of various reactants that can be employed:

| Reactant: | Product |
|---|---|
| N,N'-dimethylethylene diamine | Poly(N,N'-dimethylethylene urea). |
| Ethylenediamine | Poly(ethylene urea). |
| Trimethylenediamine | Poly(trimethylene urea). |
| 1,3-butylenediamine | Poly($\alpha$-methyltrimethylene urea). |
| Hexamethylenediamine | Poly(hexamethylene urea). |
| 1,5-heptylenediamine | Poly($\alpha$-ethylpentamethylene urea). |
| Octamethylenediamine | Poly(octamethylene urea). |
| 1,6-decylenediamine | Poly($\alpha$-butylhexamethylene urea). |
| N,N'-dimethyl 1,7 decylenediamine | Poly(N,N'-dimethyl-propyl-hexamethylene urea). |
| o-Phenylenediamine | Poly(o-phenylene urea). |
| p-Phenylenediamine | Poly(p-phenylene urea). |
| 2,4-diaminotoluene | Poly(o-methyl m-phenylene urea). |
| 2,5-diamino-p-xylene | Poly(2,5-dimethyl p-phenylene urea). |
| 2,4-diaminocumene | Poly(o-isopropyl m-phenylene urea). |
| N-phenyl p-phenylene diamine | Poly(N-phenyl p-phenylene urea). |
| Piperazine | Poly(piperazine carbonyl). |
| 2,6-diaminonaphthalene | Poly(2,6-naphthylene urea). |
| 2,7-diamino-1-methyl-naphthalene | Poly(1 methyl 2,7 naphthylene urea). |

The reaction can be conducted in an excess of the reactant amine, the excess serving as the reaction medium. If desired, however, a stoichiometric amount of mercuric salt and amine can be employed to complete the carbonylation of the reactant. Preferably however, particularly when a high melting point amine is used, an inert diluent is employed that is liquid at the reaction conditions and inert to the reactants. Examples of suitable organic solvents that can be employed include various ethers such as methylethyl ether, diethyl ether, diisopropyl ether, diisoamyl ether, ethylbenzyl ether, diethylene glycol diethyl ether, triethylene glycol diethyl ether, tetraethylene glycol dimethyl ether, etc.

Various esters can also be employed as a solvent, e.g., methyl formate, ethyl formate, methyl acetate, ethyl acetate, propyl formate, isopropyl acetate, ethyl propionate, butyl formate, sec-butyl acetate, isobutyl acetate, ethyl butyrate, butyl acetate, isoamyl acetate, amyl acetate, glycol diformate, isoamyl butyrate, ethyl acetylacetate, glycol diacetate, isoamyl isovalerate, methyl benzoate, ethyl benzoate, methyl salicylate, propyl benzoate, dibutyl oxalate, etc.

The saturated or aromatic hydrocarbons can of course be used as a suitable inert solvent, e.g., pentane, hexane, heptane, octane, decane, dodecane, benzene, toluene, xylene, kerosene, naphtha, etc.

A source of mercuric ion is dissolved or dispersed in the reaction medium for the carbonylation. Examples of suitable sources of mercuric ion that can be employed include the various mercuric carboxylates, e.g., mercuric acetate, mercuric propionate, mercuric butyrate, mercuric isobutyrate, mercuric valerate, etc. Other mercuric salts which include the sulfate, nitrate, chloride or mercuric oxide can also be used. Of the foregoing, mercuric acetate and oxide are preferred.

Mercuric oxide is also preferred when polymers are prepared and, most preferably, the mercuric oxide is used in a stoichiometric ratio to the diamine reactant to obtain maximum molecular weights of the polymer. Again, the aforementioned solvents can be used and carbon monoxide is used in excess.

The reaction is believed to proceed through two stages; the first stage involves the formation of an addition product between mercuric ion, carbon monoxide and the amine reactant and the second stage involves the decomposition of this addition product to metallic mercury, protons, and the substituted urea or polymer. When the previously mentioned preferred mercuric acetate salt is employed, the reaction products are the substituted urea or polymer, acetic acid and metallic mercury.

While the reaction can be performed in a single step by introducing the reactants, i.e., carbon monoxide, the primary or secondary amine or diamine and the mercuric salt into a reaction zone at a temperature between about 100° and about 300° C. in a pressure between about 10 and about 1000 p.s.i.g., it is generally preferred to employ two reaction stages. In the first stage, the solution is treated to saturation with carbon monoxide to form the aforementioned addition product and the solution is thereafter heated to the necessary reaction temperature to decompose the addition product and form the substituted urea or polymer product. In general, temperatures between about 0° and about 150° C. can be used in the first step to absorb carbon monoxide to complete saturation; preferably temperatures between about 25° and about 75° C. are used. High pressures are preferred in this stage to favor the absorption of the carbon monoxide, generally pressures from about 10 to about 2000 p.s.i.g. can be used; preferably between about 100 and about 500 p.s.i.g. are used.

The length of the primary carbon monoxide absorption step depends somewhat on the degree of contacting achieved between the liquid and gas phase. The necessary length of time can readily be determined by observing when carbon monoxide is no longer absorbed, as reflected by, e.g., the achievement of a steady reaction pressure or any other indication that a portion of the gas phase is no longer being absorbed. In general, the amount of time to achieve this condition will vary between about 10 and about 300 minutes.

Thereafter, the reactants are heated in the second stage to the necessary temperature to form the substituted urea or polymer product and the reduced mercury metal. Generally, temperatures between about 150° and about 300° C. can be used in this stage; between about 175° and 225° C. are preferred.

The crude reaction product is readily decanted to separate the organic products from metallic mercury, the former can then be distilled to recover the carboxylic acid formed when mercuric carboxylates are used and to recover the substituted urea or polymer product when the latter are more volatile then the solvent employed. Alternatively, when the solvent is more volatile, it can be evaporated from the crude product to concentrate the latter sufficiently for subsequent product recovery steps such as crystallization and/or extraction. Generally, however, the crude reaction product after its separation from mercury can be readily treated to recover the desired substituted urea product by extraction or by chilling and filtration without prior concentration or distillation. Subsequently crystallization can be employed to improve the purity of this product when applicable.

The solvent after recovery of the desired product can be combined with the mercury and the mixture subjected to known oxidizing conditions to oxidize the mercury to a soluble mercuric salt for recycling to the reaction. Various conventional oxidizing conditions can be employed in this step, e.g., nitric acid, chromic acid, permanganates, ozone, nitrogen oxides, etc. can be employed together with oxygen when desired under temperatures between about 0° C. and about 250° C. to reoxidize the mercury to a mercuric salt for recycling.

The following examples will serve to illustrate a mode of practicing my invention.

*Example 1*

To a 300 milliliter capacity titanium bomb was added 100 grams of aniline, 21 grams mercuric oxide and 1 gram of mercuric nitrate. The bomb was then closed and pressured to 400 p.s.i.g. with carbon monoxide. The mixture was rocked and heated at 70° centigrade for 3 hours until no further uptake of carbon monoxide was observed. Thereafter, the bomb was heated to 200° C. and held at that temperature for 3 hours. After the 3-hour period, the bomb was cooled, opened and the crude product was filtered to separate metallic mercury from the organic products. A brown filtrate was recovered, which upon cooling deposited 9 grams of a white crystalline product, crude melting point 258°–260° centigrade. Analysis of this solid indicated the product to be carbanilide (sym. diphenyl urea).

*Example 2*

A steel bomb of 300 milliliter capacity was charged with 100 milliliters of piperidine and 31 grams of mercuric acetate. The bomb was closed and pressured to 400 p.s.i.g. with carbon monoxide. The mixture was rocked at 40° centigrade for 3 hours when no further absorption of carbon monoxide was observed. The bomb was then heated to 200° centigrade and held at that temperature for 3 hours and the pressure was observed to drop about 200 p.s.i.g. After the 3-hour period, the bomb was cooled, opened and the crude product removed therefrom and filtered to separate the metallic mercury. The brown filtrate was then distilled to yield unreacted piperidine, some N-acetyl piperidine and a dipiperidine carbonyl product, boiling point 124°–125° centigrade at 3 millimeters mercury pressure and with a refractive index of 1.5055 at 25° C. The crude distillate slowly crystallized into a solid with a melting point about 41°–42° centigrade. The infrared analysis of this product indicated it to be an N,N,N′,N′-tetrasubstituted urea, confirming the physical test indication of dipiperidine carbonyl.

*Example 3*

To 50 grams mercuric acetate, 16 grams hexamethylenediamine and 100 milliliters of ethyl acetate in a 300 milliliter capacity steel bomb was added carbon monoxide to 400 p.s.i.g. The mixture was rocked and heated to 50° centigrade for 3 hours, then 200° centigrade for 3 hours. The bomb was cooled, depressured and opened. The contents were removed and filtered to separate the mercury. The filtrate was placed on the steam bath and the solvent was removed to leave a very viscous brown liquid which gave a molecular weight of 328 by osmometry.

The preceding examples are intended solely to illustrate my invention and are not intended to be construed as unduly limiting thereof. My invention is intended to be defined by the method steps and their equivalents set forth in the following claims.

I claim:
1. The carbonylation of an amine having from 1 to about 15 carbons and selected from the class consisting of saturated aliphatic and mono- and bicyclic aromatic primary and secondary hydrocarbon amines and diamines and mono-heterocyclic hydrocarbon amines and diamines to form a substituted urea that comprises contacting said amine with carbon monoxide in the presence of a mercuric compound selected from the class consisting of mercuric carboxylates of low molecular weight carboxylic acids, sulfate, nitrate and mercuric oxide at a temperature from about 100° to about 300° C. and a pressure from about 10 to about 1000 p.s.i.g., to form said substantial urea and mercury.

2. The carbonylation of an amine to form a substituted urea that comprises reacting an amine selected from the class consisting of saturated aliphatic and mono- and bicyclic aromatic primary and secondary hydrocarbon amines and mono-heterocyclic hydrocarbon amines, said amine having from one to about 15 carbon atoms with carbon monoxide in the presence of a mercuric compound selected from the class consisting of mercuric carboxylates of low molecular weight carboxylic acids, sulfate, nitrate and mercuric oxide to form an addition product of said amine, carbon monoxide and mercuric compound and thereafter decomposing said addition product to yield mercury and said substituted urea.

3. The carbonylation of claim 2 wherein said addition product is formed by absorbing carbon monoxide at a temperature from 0° to about 100° C. and a pressure between 10 and about 100 p.s.i.g. in a first stage and, when carbon monoxide is no longer absorbed, thereafter decomposing said addition product to form said substituted urea by heating said product to a temperature from about 150° to about 300° C.

4. The carbonylation of claim 2 wherein said amine is aniline and said substituted urea is carbanilide.

5. The preparation of urea polymers from an amine having from 2 to about 15 carbon atoms and selected from the class consisting of saturated aliphatic and mono- and bicyclic aromatic primary and secondary hydrocarbon diamines and mono-heterocyclic hydrocarbon diamines that comprises reacting said diamine with carbon monoxide in the presence of a mercuric compound selected from the class consisting of mercuric carboxylates of low molecular weight carboxylic acids, sulfate, nitrate and mercuric oxide to form an addition product of said diamine, carbon monoxide and mercury and thereafter decomposing said addition product to yield mercury and said urea polymer.

6. The carbonylation of claim 5 wherein said addition product is formed by absorbing carbon monoxide at a temperature from 0° to about 100° C., a pressure between 10 and about 100 p.s.i.g. in a first stage and in the presence of a stoichiometric equivalent of mercuric oxide and, when carbon monoxide is no longer absorbed, thereafter decomposing said addition product to form said urea polymer by heating said product to a temperature from about 150° to about 300° C.

7. The preparation of a poly(alkylene urea) according to claim 6 wherein said diamine is an alkylene diamine.

8. The preparation of claim 7 wherein said alkylene diamine is hexamethylene diamine.

No references cited.

ALEX MAZEL, *Primary Examiner.*

HENRY R. JILES, *Examiner.*

JOSEPH A. NARCAVAGE, *Assistant Examiner.*

UNITED STATES PATENT OFFICE
CERTIFICATE OF CORRECTION

Patent No. 3,277,061

October 4, 1966

Donald M. Fenton

It is hereby certified that error appears in the above numbered patent requiring correction and that the said Letters Patent should read as corrected below.

Column 6, line 7, for "substantial" read -- substituted --.

Signed and sealed this 22nd day of August 1967.

(SEAL)
Attest:

ERNEST W. SWIDER
Attesting Officer

EDWARD J. BRENNER
Commissioner of Patents